(12) United States Patent
Kim

(10) Patent No.: US 11,388,448 B2
(45) Date of Patent: Jul. 12, 2022

(54) METHOD AND APPARATUS FOR ARCHIVING MEDIA CONTENT

(76) Inventor: Joachim Kim, New York, NY (US)

(*) Notice: Subject to any disclaimer, the term of this patent is extended or adjusted under 35 U.S.C. 154(b) by 0 days.

(21) Appl. No.: 13/227,447

(22) Filed: Sep. 7, 2011

(65) Prior Publication Data

US 2012/0180100 A1 Jul. 12, 2012

Related U.S. Application Data

(62) Division of application No. 09/668,700, filed on Sep. 22, 2000, now Pat. No. 8,037,502.

(Continued)

(51) Int. Cl.
*H04N 21/218* (2011.01)
*H04N 21/2312* (2011.01)
(Continued)

(52) U.S. Cl.
CPC ..... *H04N 21/2182* (2013.01); *H04N 7/17336* (2013.01); *H04N 21/21825* (2013.01); *H04N 21/2312* (2013.01); *H04N 21/2323* (2013.01); *H04N 21/23113* (2013.01); *H04N 21/23406* (2013.01)

(58) Field of Classification Search
USPC ........................................................ 725/115
See application file for complete search history.

(56) References Cited

U.S. PATENT DOCUMENTS 5,130,792 A 7/1992 Tindell et al.
5,133,079 A 7/1992 Ballantyne et al.
(Continued)

FOREIGN PATENT DOCUMENTS

WO WO199941684 8/1999

OTHER PUBLICATIONS

Hauptmann A G et al: "Artificial intelligence techniques in the interface to a digital video library", Proceedings of the SIGCHI Conference on Human Factors in Computing Systems; [Conference on Human Factors in Computing Systems], New York, NY, USA, Mar. 22, 1997 (Mar. 22, 1997), p. 2/3, XP002134683, DOI: 10.1145/1120212.1120214 ISBN: 978-0-89791-802.

(Continued)

*Primary Examiner* — Brian T Pendleton
*Assistant Examiner* — Jean D Saint Cyr
(74) *Attorney, Agent, or Firm* — Seyfarth Shaw LLP; Brian Michaelis

(57) ABSTRACT

The present invention is directed to a method and apparatus for archiving media content, and more particularly to archiving television and radio broadcasts for later delivery, on-demand, via the Internet. A capture server is used to receive and gather a plurality of media sources for archiving and subsequent delivery to client users. The capture server is capable of receiving numerous digital or analog media signals from a variety of media sources, including transmission through traditional broadcast, coaxial cable, the Internet, personal and public camera systems and the like, and converting these media signals into addressable blocks of media content. Furthermore, the capture server is capable of encoding received media signals, particularly analog media signals, applying an application programming interface and preparing the media signals for implementation by the system in an identifiable form or architecture.

23 Claims, 5 Drawing Sheets

Related U.S. Application Data

(60) Provisional application No. 60/175,656, filed on Jan. 12, 2000.

(51) Int. Cl.

| | |
|---|---|
| *H04N 21/858* | (2011.01) |
| *H04N 21/231* | (2011.01) |
| *H04N 21/232* | (2011.01) |
| *H04N 21/258* | (2011.01) |
| *H04N 21/443* | (2011.01) |
| *H04N 21/234* | (2011.01) |
| *H04N 7/173* | (2011.01) |

(56) References Cited

U.S. PATENT DOCUMENTS

| | | | |
|---|---|---|---|
| 5,253,275 A | 10/1993 | Yurt et al. | |
| 5,532,833 A | 7/1996 | Hong et al. | |
| 5,720,037 A | 2/1998 | Biliris et al. | |
| 5,737,532 A | 4/1998 | DeLair et al. | |
| 5,742,347 A | 4/1998 | Kandlur et al. | |
| 5,751,883 A | 5/1998 | Ottesen et al. | |
| 5,767,923 A * | 6/1998 | Coleman, Jr. | G11B 27/28 348/700 |
| 5,790,176 A | 8/1998 | Craig | |
| 5,892,535 A | 4/1999 | Allen et al. | |
| 5,899,582 A | 5/1999 | DuLac | |
| 5,930,493 A | 7/1999 | Ottesen et al. | |
| 6,005,599 A | 12/1999 | Asai et al. | |
| 6,020,924 A * | 2/2000 | Jahanghir | H04N 19/61 375/E7.094 |
| 6,094,680 A | 7/2000 | Hokanson | |
| 6,289,346 B1 | 9/2001 | Milewski et al. | |
| 6,317,885 B1 | 11/2001 | Fries | |
| 6,360,234 B2 | 3/2002 | Jain et al. | |
| 6,438,596 B1 | 8/2002 | Ueno et al. | |
| 6,463,445 B1 * | 10/2002 | Suzuki | H04L 67/2823 |
| 6,539,164 B2 | 3/2003 | Shirakawa et al. | |
| 6,546,555 B1 | 4/2003 | Hjelsvold et al. | |
| 6,820,084 B2 * | 11/2004 | Barrett et al. | |
| 7,000,245 B1 * | 2/2006 | Pierre | H04N 21/426 386/331 |
| 7,559,015 B2 * | 7/2009 | Munetsugu et al. | 715/204 |
| 2002/0069355 A1 * | 6/2002 | Garrison | 713/153 |
| 2003/0088646 A1 * | 5/2003 | Yeo | H04N 21/4438 348/E7.071 |
| 2004/0013412 A1 * | 1/2004 | Tanaka | G11B 27/329 |
| 2004/0031054 A1 * | 2/2004 | Dankworth et al. | 725/86 |
| 2004/0105389 A1 * | 6/2004 | Huang | H04L 45/122 370/254 |
| 2004/0184783 A1 * | 9/2004 | Tanaka | G11B 20/10527 386/240 |
| 2004/0187160 A1 * | 9/2004 | Cook | H04N 21/2385 725/115 |
| 2005/0033760 A1 * | 2/2005 | Fuller et al. | 707/100 |
| 2005/0045712 A1 * | 3/2005 | Paul | B41J 2/17503 235/375 |
| 2008/0133660 A1 * | 6/2008 | Salesky | G06Q 10/10 709/204 |
| 2012/0137223 A1 * | 5/2012 | Nicol | G06F 17/30038 715/730 |
| 2014/0064484 A1 * | 3/2014 | Shamoon | H04L 63/0428 380/201 |

OTHER PUBLICATIONS

Susan Gauch et al: "The Vision Digital Library", Information Processing & Management, vol. 33, No. 4, pp. 413-426, 1997. Elsevier Science Ltd. Great Britain.

\* cited by examiner

Data 120

METHOD AND APPARATUS FOR ARCHIVING MEDIA CONTENT

CROSS REFERENCE TO RELATED APPLICATIONS

This application is a divisional application of co-pending U.S. application Ser. No. 09/668,700 entitled METHOD AND APPARATUS FOR ARCHIVING MEDIA CONTENT, filed in the USPTO on Sep. 22, 2000 naming the same inventor, which claims priority under 35 U.S.C. 119 (e) from U. S. Provisional Application No. 60/175,656 naming the same inventor filed Jan. 12, 2000, both of which are herein incorporated by reference in their entirety.

FIELD OF THE INVENTION

The present invention is directed to a method and apparatus for archiving and delivering media content, and more particularly to archiving television and radio broadcasts for later delivery, on-demand, via the Internet.

BACKGROUND OF THE INVENTION

Years ago, the television and radio broadcasts were "live," meaning that the television or radio broadcast were being made at the same time that the viewer or listener were watching or listening. The broadcasters later found that they could pre-record the shows for later broadcast. Despite this advance, viewers or listeners still needed to watch or listen to the broadcast at the time it was made on the local station.

Although the remainder of this application primarily discusses the prior art and the invention with respect to television and video, the discussion is equally applicable to radio. Accordingly, the term viewer, where the context permits, should be read to mean viewer or listener, and the term television, as the context dictates, should be read to include both video and radio. Moreover, where the term broadcast is used in connection with television, it is intended to refer to television broadcast over cable as well as television broadcast over airwaves.

Some years ago, with the advent of the VCR, television viewers were presented with the ability to "record" a broadcast—permitting the viewer to "time shift" programming. In other words, a viewer could watch a show at different time from when it was broadcast. In addition to "time shifting" the VCR presented another significant advantage—what are herein referred to as VCR-like functions, namely, the ability to fast forward, to rewind and/or to pause the playback. One drawback of a VCR is that the tape technology employed requires that the viewer wait until the entire recording is made prior to playing the recording for viewing. Recently, non-tape systems have been introduced that enable a user to play the recording without waiting for the recording to be complete. Such systems are sold under brands such as TIVO and REPLAY TV. Even using such newer technologies, viewers must remember to have the system record the desired event. Moreover, the device has an unattended recording limit created by the media upon which the content is stored. For example, a VHS type or 8 millimeter VCR tape may typically record 2 hours, or, at a lower quality, up to 8 hours of content. Some tapes can even store more. Instead of using tapes, the TIVO and REPLAY TV systems store content digitally on, for example, computer mass storage device such as a disk. Although no tape is used, these systems can generally provide VCR-like functions. The disks sold with such systems often have TO capacities of a couple of hours or more, some possibly having tens of hours or more of storage capacity. Regardless of whether a viewer is using a tape system or a disk system—the media eventually fills and requires user intervention to either delete and reuse the media or to insert new media into the unit. Accordingly, viewers must know in advance what shows they desire to record, and must plan to have media available for that recording.

Another more recent change from simple broadcast television is media-on-demand. While today media-on-demand is not generally available on a wide-spread basis, it is available in some areas. A media-on-demand system is generally organized around viewing an entire "show" or movie. The media-on-demand system permits a viewer to request a particular program, and then that program is substantially immediately delivered to the viewer. In more sophisticated media-on-demand systems, the viewer is provided VCR-like functions.

There are also means for content delivery that have become popular over the Internet, namely, downloading, Internet broadcasting and streaming.

Downloading something actually means receiving a copy of it. In other words, a person desiring a particular content element (such as a show or a movie preview or even an advertisement) must locate the element from a source that makes it available for downloading, select the element, and have the source transmit the content element, via the Internet, to local storage space on that person's computer or to storage at another location accessible to that person. The downloaded content element is generally stored as a file on the requester's computer, and the file is usually an exact copy of the original file that was "downloaded." When the requestor desires to view the content element, a viewing program on a computer is invoked and the downloaded file identified thereto. The viewing program then displays the file. Most viewing programs for viewing moving images have VCR-like functions available to the viewer. There are a number of drawbacks to downloading. First, the content element must be completely received before it can be viewed. In the event that, for example, the download was a half-hour television show, the download from the Internet could take a significant amount of time. Moreover, the viewer may have interest in one small portion of the entire downloaded file, and the download with respect to the remainder of that file was wasteful. Worse, the viewer may determine only seconds after beginning to view the download, that the wrong information was downloaded. Second, the viewer is not afforded random access to portions of the content element before a complete download has taken place. If the viewer desires to view a short section of the content element that starts, for example, in the middle of the content element file, the viewer must commence viewing (or at least downloading) the content from the beginning until the desired portion of the content file is reached. Another drawback of the prior art is that in order to play multiple content elements, the first stream of data must end, and a second data stream must be subsequently buffered and then played—causing a pause between content elements. There is a need for a method and apparatus to play content elements seamlessly.

To receive an Internet broadcast, a viewer selects the broadcast of interest from a source making the broadcast available, and the source thereafter "streams" the data representing the broadcast directly to a broadcast-viewing program. Generally a broadcast-viewing program does not permit the viewer to fast-forward in a broadcast because the information "ahead" of the present position has not been broadcast yet. Moreover, a viewer cannot generally rewind a broadcast in a broadcast-viewing program. More sophisticated broadcast viewing programs may, however, permit limited VCR-like functions by storing the received broadcast information and permitting the viewer to rewinding back to the point where the particular viewer joined the live stream; and similarly to permit pausing, and to permit fast-forwarding, to catch-up to the live stream if the viewer has rewound or paused. These functions would not be unlike the functions of TIVO and REPLAY TV that permit the same type of functions with broadcast television. In any event, the viewer of an Internet broadcast is limited to viewing the portions of the broadcast that he or she received.

Streaming refers to a transmission of a content element over the Internet, the content element being destined for a stream viewing program rather than storage on a storage device. As with downloading, to stream a content element, a person must locate the element from a source that makes it available for streaming, and have the source transmit the content element, via the Internet, to a stream viewing program. As is well known in the art, most stream viewing programs buffer the content element into temporary files. While downloading and streaming share many similar attributes, the streaming content element is usually buffered in temporary files until it is no longer needed, and the temporary files are thereafter deleted. The stream-viewing program may also provide VCR-like functions. While streaming has many advantages over downloading, it too has its drawbacks.

SUMMARY OF THE INVENTION

The present invention is directed to a method and apparatus that satisfies the need for time shifting programming, enabling a viewer to view any programming within an instant from the time it is broadcast, without the need to have cognitively recorded the program.

In addition, the present invention is directed to a method and apparatus that satisfied the need for limitless unattended recording, allowing for the recordation of every broadcast from every channel all the time.

The method and apparatus (delivery apparatus) contemplated by the present invention receives media in the form of digital or analog media signals from a variety of media sources, including transmission through traditional broadcast, coaxial cable, the Internet, personal and public camera systems and the like, and converts these media signals into addressable blocks of media content. These media content blocks are then saved in addressable format on a mass data storage device accessible by a client user.

A client user wishing to view the saved media content inputs a request to the aforementioned delivery apparatus, providing sufficient identification to describe the media content to be viewed. The apparatus then retrieves the first block of media content from the mass storage device, and transmits this media content to the client user. The delivery apparatus then retrieves the next block of media content to be viewed, "stitches" the subsequent media content to the first media block transmitted, and transmits the media block to the client user in an apparent seamless conveyance.

The present invention is directed to a system for archiving time sequenced media content from a media signal. The instant system comprises a data storage device, a capture server, and a network that operatively connects the data storage device and capture server.

The data storage device is adapted to store blocks of media data in an addressable and retrievable manner. The capture server is adapted to receive the media signal, and being operatively connected to the network, is able to write blocks of media data to the data storage device in an addressable and retrievable manner. The capture server comprising an encoder, for digitizing the media signal into a time-sequence of digital frames and a corresponding audio component; a converter for converting the time-sequence of digital frames into plurality of sequential media blocks, each of the sequential media blocks comprising the data representing a consecutive number of digital frames and the corresponding audio components; a storage manager for determining an address for each of the sequential media blocks; and a storing processor, for writing each of the sequential media blocks to a location corresponding to the address determined by the storage manager.

Another embodiment of the present invention is directed to a system for archiving time sequenced media content from a digital media signal, the digital media signal having a time-sequence of digital frames and a corresponding audio component. The instant system comprises: a data storage device, a capture server, and a network operatively connecting the data storage device and the capture server.

The data storage device is adapted to store blocks of media data in an addressable and retrievable manner. The capture server is adapted to receive the digital media signal, being operatively connected to the network, is able to write blocks of media data to the data storage device in an addressable and retrievable manner. The capture server comprises: a converter for converting the digital media signal into plurality of sequential media blocks, each of the sequential media blocks comprising the data representing a consecutive number of digital frames and the corresponding audio components; a storage manager for determining an address for each of the sequential media blocks; and a storing processor, for writing each of the sequential media blocks to a location corresponding to the address determined by the storage manager.

Another embodiment of the present invention is directed to a method for archiving, on a data storage device, time sequenced media content from a media signal. The data storage device is operatively connected by a network, and is adapted to store blocks of media data in an addressable and retrievable manner. The network is also operatively connected to a capture server. The capture server is adapted to receive the media signal, and, via the network, write blocks of media data to the data storage device in an addressable and retrievable manner. The instant method comprises the steps of:

digitizing the media signal into a time-sequence of digital frames and a corresponding audio component; converting the time-sequence of digital frames into plurality of sequential media blocks, each of the sequential media blocks comprising the data representing a consecutive number of digital frames and the corresponding audio components; determining an address for each of the sequential media blocks; and writing each of the sequential media blocks to a location corresponding to the address determined by the storage manager.

DETAILED DESCRIPTION OF THE INVENTION

Figure 1:
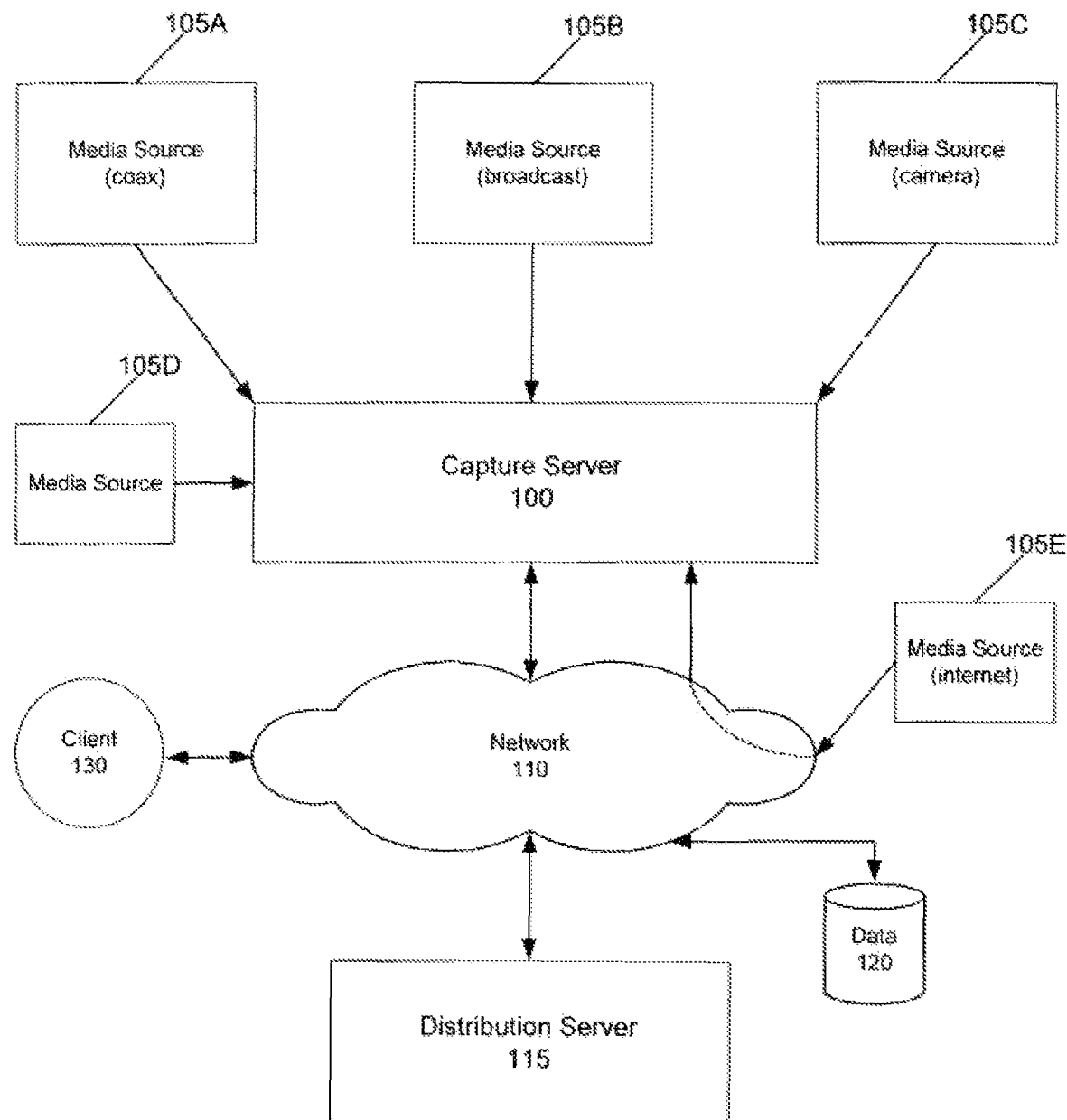
FIG. 1 is a block diagram illustrating a method and apparatus for archiving and delivering media content in accordance with one embodiment of the present invention.

A block diagram illustrating a method and apparatus for archiving and delivering media content in accordance with one embodiment of the present invention is shown in FIG. 1. This embodiment is shown in simplified form for the purpose of clarity. However, the method comprising the present invention is designed to replicate well beyond the size depicted here.

Capture server 100 is an apparatus for receiving and gathering a plurality of media sources for archiving and subsequent delivery to client users. Capture server 100 is capable of receiving numerous digital or analog media signals from a variety of media sources, including transmission through traditional broadcast, coaxial cable, the Internet, personal and public camera systems and the like, and converting these media signals into addressable blocks of media content. Furthermore, capture server 100 is capable of encoding received media signals, particularly analog media signals, applying an application programming interface and preparing the media signals for implementation by the system in an identifiable form or architecture.

Media sources 105(a) through (e) are a plurality of media sources transmitting media content to the system via capture server 100. The media may be in analog form, for example, as produced by television or radio broadcast, cable television or camera signal; or digital format, such as transmitted by particular Internet applications.

Network 110 is a network connecting various client users, media content, servers and storage devices. In one embodiment of the invention, network 110 is a connectionless network or datagram service between stations, commonly referred to in today's parlance as the Internet. Network 110 is capable of providing the necessary data communication service between the client users, distribution servers, media sources, data storage devices and capture servers.

Distribution server 115 is an apparatus for receiving media requests from a client user over network 110 determining the location of the requested media data on the network, and directing the transmission of the requested media to the client user via network 110. A distribution server may be part of a distribution hierarchy, where each distribution server may have one or more parents and/or children distribution servers. In this embodiment, each parent or child distribution server will have their own media data storage and "cost" associated with transmitting particular media content to a requester.

When directing the transmission of media data, Distribution server 115 may apply a "cost" algorithm to ensure the transmission is made through the most efficient distribution server. Efficiency, i.e., cost, may be based on several parameters including, for example, transmission time, latency, delivery time, protocols, quality of services, physical delivery costs, distribution server load, network throughput (load), effective bandwidth, etc., or any combination of the same. Distribution server 115 may redirect the transmission of media data to other distribution servers based on the "cost" algorithm and efficiency model. Distribution server 115 also is capable of "stitching" separate media content blocks together for transmission to the requesting client user as an apparently seamless stream of media data.

If the media content is streamed too fast, a number of problems occur. First, if a user decides not to consume all of the delivered media some or much of the delivery may be wasted. Moreover, if the user does consume the delivery, the user's local buffer will overfill and cause an overrun condition. An overrun condition may result in losing delivered content, which causes the delivery to have a "cost" greater than would be necessary; and, it may also cause degradation to the user's content—such as "skipping."

On the other hand, if the media content is streamed too slow, other problems occur, referred to as an under run condition. When an under run occurs, the user's viewer has no data available to display—and thus freezes, causing jerkiness in the playback.

To overcome these problems, the distribution server 115 is capable of "throttling" the delivering of media content to the client user to facilitate a reduction or elimination of overrun and under run conditions of the media content. Throttling refers to the control of the speed of delivery. In one embodiment of the invention, this throttling function is based on the captured bit rate of the content media. In other words, if the content media was captured at a given frame rate, the throttling function attempts to delivers the content media to the user at the same average bit rate after making a provision for buffering at the user side. The distribution server 115 may also have the ability to cache incoming media content to increase system efficiency and speed.

Data storage 120 is a collection of all media content received and transformed by capture server 100 into media blocks. Data storage 120 may comprise any type of magnetic, optical or similar mass data storage device capable of storing blocks of media data for future retrieval. In one embodiment of the invention, data storage 120 may comprise: on-line block data storage devices such as disk drives; near-line storage devices such as tape drives; and off-line storage devices, such as tape libraries. The distribution server 115 may also work in conjunction with data storage 120 to perform caching and replication operations.

Although the embodiment above describes only a single data storage 120, it will be apparent to one of skill in the art that multiple data storage systems may be used to provide load distribution, data redundancy and/or data distribution. The data storage systems, such as data storage 120, may be individually or commonly connected to the Network 110.

In one embodiment of the invention as depicted in FIG. 1, media sources 105(a) through (d) supply media content directly to capture server 100. In an embodiment of the invention as depicted in FIG. 1, media content 105(a) is a cable television broadcast received via coaxial cable lines, media content 105(b) is a traditional network television broadcast, media content 105(c) is a transmission from a public video camera (for example a "traffic cam"), and media content 105(d) is satellite television broadcast received via satellite transmission. In addition, media source 105(e) supplies media content to capture server 100 over the network in digital format. Although five media sources are shown for the purpose of this example, any number of media sources may be input to capture server 100. In a preferred embodiment of the invention, a media source is input into capture server 100 for each particular television channel and radio station for a particular locale.

Capture server 100 gathers the incoming media content and organizes the data stream into content media blocks. The content media blocks may be of a fixed or non-fixed unit file size. In one embodiment of the invention, the content media blocks are based on atomic unit time blocks. In a preferred embodiment of the invention, the data stream is organized into time blocks of approximately one minute. The data stream, however, may be organized into longer or shorter time blocks. In another embodiment of the invention, the content media blocks may comprise non-unit size blocks.

Preferably, capture server 100 then encodes the incoming analog media content signals into a digital format, and applies an application programming interface (API) to all digital data to achieve a consistent format. Capture server 100 then transmits the media blocks to data storage 120 via network 110 for storage in an addressable format. In one embodiment of the invention, the addressable format used by capture server 100 to store data to data storage 120 is a directory tree represented as: source-channel/year/month/day/hour/minute/seconds, where "seconds" is the actual file.

Capture server 100 may also gather and store Close Caption Data (CCD) associated with the saved media content as a text media block file in data storage 120. CCD is the textual equivalent of any articulated word in the media content. As with the media content block, the text media block may be of a fixed or non-fixed unit file size. However, in a preferred embodiment, the text is stored by the whole word, i.e. the words comprising the text media block can not be truncated.

The text media block is preferably stored in proximal time relation with the content media block. Because the text media block comprises whole words, the text may not be frame aligned with the content media block. In a preferred embodiment, the text in the text media block is adjusted forward or backward to ensure that the text begins or ends with the whole word articulated in the corresponding content media block.

In another embodiment of the invention, the text media block comprises whole words, not necessarily in proximal time relation with the content media block. In this embodiment, each text media block is associated with a content media block reference code, for example, a time code or a frame code. This reference code allows the text media block to be related back to the content media block containing the articulated text.

To retrieve media content from the system, client user 130 places a request to distribution server 115 for a selection of media content to be viewed. In one embodiment of the invention, distribution server 115 contacts data storage 120 and requests a copy of the first block of client requested media content. Data storage 120 then transmits the first requested media content block to distribution server 115. Once received, distribution server 115 transmits the first media content block to client user 130.

During transmission of the first block of requested media content to client user 130, a recursion subroutine automatically requests a copy of the second block of client requested media content. Data storage 120 transmits this second block of media content to distribution server 115, where the second media content block is "stitched" to the first media content block for apparent seamless transmission to client user 130. The method of transmitting media back to back for transmission to an end user is well known to a person of ordinary skill in the art. However, the present method of "stitching" media together for apparent seamless transmission is believed to be new.

This method is repeated until terminated by client user 130, or until the request for the media content has been satisfied.

Media content can also be retrieved by using a Close Caption filter (CC filter) to search the CCD text media blocks for selected key words. Once the key word is found in a CCD text media block, the media content block associated with the text media block is determined. A request is placed to distribution server 115 for a selection of media content commencing with this media content block. The media content is then transmitted to the requestor as described above.

In one embodiment of the invention, the CC filter contains different rules that can be applied to the CCD text media blocks. These rules may include, for example, a start point, stop point, word by word search criteria, phrase by phrase search criteria or uniform resource locator (URL). When performing a search on the CCD text media blocks, encountering text that satisfies any of these rules will trigger the activity associated with the rule. For example, a rule may request video of the Channel 4 evening news commencing when the word "sports" is encountered, and continuing for 5 minutes thereafter. When received, the CCD text media blocks associated with the Channel 4 evening news are searched until the word "sports" is encountered. A video starting point is established by determining which media content block is associated with the text media block containing the word "sports". Once established, the distribution server 115 obtains 5 minutes of media content blocks, commencing with the video starting point, from data storage 120. Similarly, if the text media block contains a URL, the rule may trigger an activity associated with that URL.

Figure 2:
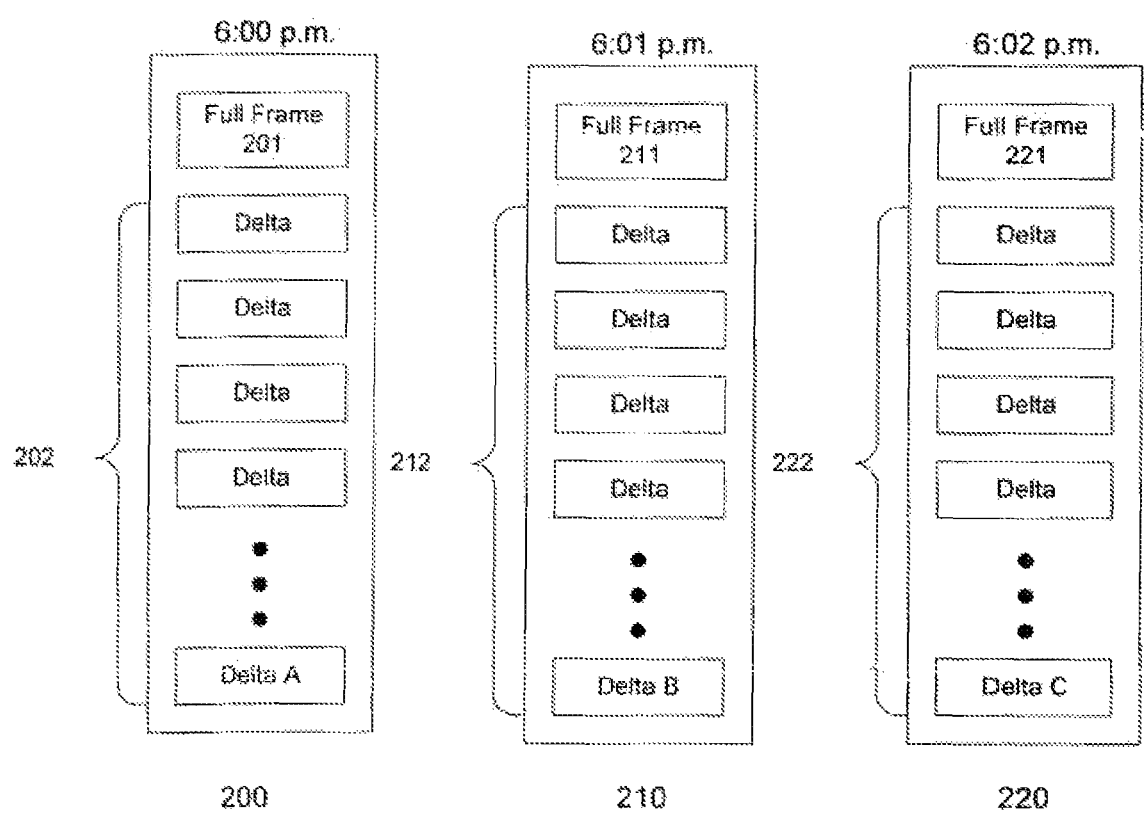
FIG. 2 is a block diagram illustrating the media data stored in time driven intervals according to one embodiment of the present invention.

A block diagram illustrating the media content blocks stored in time driven intervals according to one embodiment of the present invention is shown in FIG. 2. This embodiment is shown in simplified form for the purpose of clarity. However, the method comprising the present invention is designed to replicate well beyond the size depicted here.

Content media blocks 200, 210 and 220 are three sequential one-minute media content blocks for a given media content. Although one-minute media content blocks depict one embodiment of the present invention, the time increment for each block is not significant, and any time interval may be used provided that the media content block comprises an integral number of frames. Moreover, the frames, which may be full frames and/or delta frames are arranged such that each media content block is a viewable unit—in other words, all of the frames in the media content block may be viewed without reference to data regarding other frames. In a preferred embodiment of the invention, each media block begins with one full frame, and thereafter, comprises one or more delta frames. Alternatively, each media block may begin with one full frame, and thereafter comprise a combination of full and delta frames, however, this is not essential for the operation of the invention. It is also contemplated by the present invention that each media content block may comprise only one or more full frames, and no delta frames.

As is well known in encoding, such as MPEG encoding, a full frame is a complete frame of the media content that may be displayed without reference to data from other frames. Delta frames represent only the changes or "delta's" in media content from the previously displayed frame. Placing a full frame at the beginning of each media content block ensures that a client user will see a complete frame at the beginning of the media content block, regardless of which media content block is the start point. Delta frames indicate only changes in the media content from frame to frame, greatly reducing the file size of each media content block. The storage and playback from media content blocks allows for the access to the media content from the start of any media content block, and seamless transmission of a stream beginning with any media content block. Thus, the number of frames contained in each media content block determines the "resolution" with which the media content can be accessed. In other words, where the media content blocks contain 1 minute of media content each, the media content can easily be reproduced beginning at any 1 minute interval. Moreover, because of the limited size of the media content block, media content can be viewed from any frame within the media content block with substantially less delay then would be required to view the media content if it were stored in a single content file. For example, if there were thirty one-minute media content blocks representing a thirty minute interval of media content, and the media content is to be reproduced from forty seconds into the fifteenth minute, only forty seconds worth of frames need be read and not displayed. In the prior art, the entire fourteen minutes and forty seconds would need to be read and not displayed.

By way of example in FIG. 2: full frame 201 represents a full frame for media content block 200, and the remaining frames 202 represent delta frames for media content block 200; similarly, full frames 211 and 221 represents full frames for media content blocks 210 and 220, respectively, and remaining frames 212 and 222 represent delta frames for media content blocks 210 and 220, respectively. In the example, each media content block 200, 210, 220 represents one minute of media content. In a preferred embodiment, each media content block 200, 210 and 220, comprises frames of media content corresponding to between 1 and sixty seconds of media content. The invention, however, contemplates media content blocks having sizes that could range from as small as a single frame, to minutes, or even hours worth of frames, depending upon the type of media content being stored, and the likely required access thereto. A determination of the number of frames within each block will be within the skill in the art. It is important to note that each of the media content blocks can be delivered to a viewer, which can reproduce the entire block of media content without reference to any other media content block or other frame data. Accordingly, the media content blocks do not necessarily have to be delivered to the viewer in time sequence order.

In delivery of media content blocks 200, 210, 220 to a viewer (not shown), the first media content block 200 to be viewed is delivered as it is stored. When the second and third media content blocks 210, 220 are appended to the end of the preceding media content block 200, 210, respectively, they are "stitched" to the preceding block, providing a seamless stream of data to the viewer. Accordingly, using the present invention, the viewer is "unaware" that the media content is being provided from separate files, but instead, views the data as though it is a single continuous stream.

Figure 3:
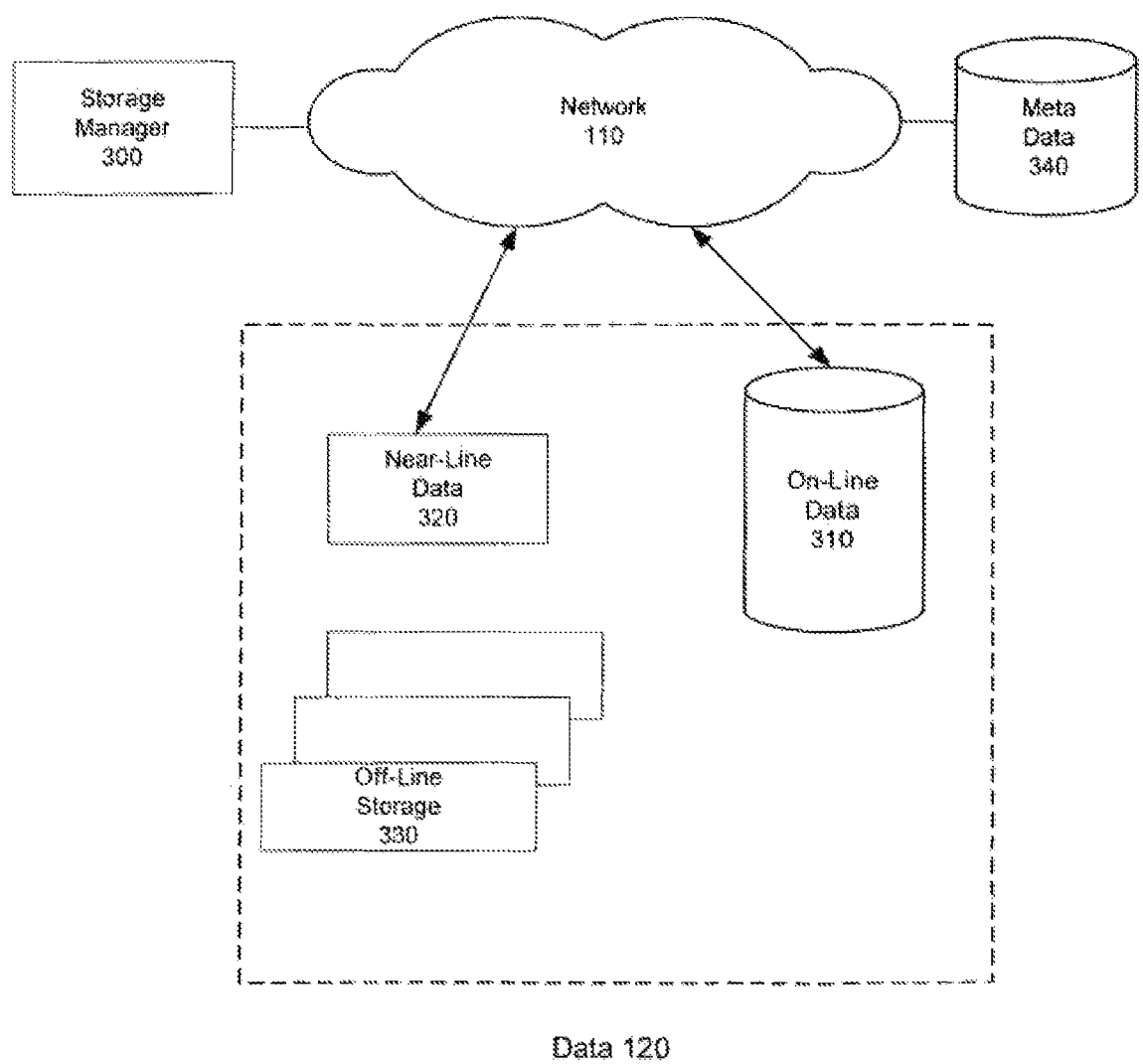
FIG. 3 is a block diagram illustrating the storage manager's interaction with the media data according to one embodiment of the present invention.

A block diagram illustrating a storage manager's interaction with the media content according to one embodiment of the present invention is shown in FIG. 3. This embodiment is shown in simplified form for the purpose of clarity. However, the method comprising the present invention is designed to replicate well beyond the size depicted here.

Storage manager 300 controls the movement of media content on the system and interacts with the distribution server (not shown), data storage 120 and meta-data 340 over network 110.

In one embodiment of the invention, data 120 comprises on-line data storage 310, near-line data storage 320 and off-line data storage 330. On-line data storage 310 is a device or devices capable of storing and retrieving media content in a timely fashion. In one embodiment of the invention, on-line data storage 310 is a mass media storage device such as a hard disk. In another embodiment of the invention, on-line data storage 310 is an optical disk storage device. In still further embodiments of the invention, on-line data storage 310 is any device capable of storing and retrieving mass media data in a timely fashion.

Near-line data storage 320 is a device or devices capable of automatically retrieving data stored remotely in a timely fashion. In one embodiment of the invention, near-line data storage 320 is a tape drive system.

Off-line data storage 330 is a device or devices capable of long term archival of saved media content. In one embodiment of the invention, off-line data storage 330 comprises tape libraries.

Meta-data 340 is a collection of information or data for all media content blocks created by capture server 100 and stored on data storage 120. Meta-data 340 may comprise any type of magnetic, optical or similar data storage device capable of storing blocks of data for future retrieval. In one embodiment of the invention, meta-data 340 comprises a single on-line data storage device. Alternatively, meta-data 340 may comprise a plurality of on-line data storage devices, either commonly, or individually connected to the Network 110. Where a plurality of on-line storage devices is employed, as will be apparent to one of skill in the art, it may provide load distribution, data redundancy and/or data distribution. Examples of typical data stored in meta-data 340 are shown in the following database schema table, although this meta-data is not essential for operation.

| I. CHANNEL TABLE | | |
|---|---|---|
| Field Name | Type | Definition |
| Channel_id | Integer | Identifier used to internally refer to a channel |
| Channel_name | Character | Public name of the channel |
| Channel_logo | Character | Base URL reference for an image representing the channel |

| II. MIME TYPES TABLE | | |
|---|---|---|
| Field Name | Type | Definition |
| Mime_type_id | Integer | Internal reference id for a specific delivery mime type |
| Mime_type | Character | HTTP mime type used for delivery. |

| III. PROGRAM TABLE | | |
|---|---|---|
| Field Name | Type | Definition |
| Program_id | Integer | Internal identifier representing a reference to a specific program |
| Program_name | Character | Public name of a program. |
| Program_keys | Character | Public keys to |

III. PROGRAM TABLE

| Field Name | Type | Definition |
|---|---|---|
| | | allow search for a program by keywords. |

IV. FILE LOCATION TABLE

| Field Name | Type | Definition |
|---|---|---|
| File_location_id | Integer | Internal identifier used to reference the location of a collection of video clip segments. |
| File_location | Character | Base path to the storage location. |

Video Clip Table

| Field Name | Type | Definition |
|---|---|---|
| Video_id | Integer | Internal id used to reference a single video segment |
| Channel_id | Integer | Identifier for the channel that the video segment belongs. |
| Start_time | Datetime | Starting date and time of the video segment. |
| Duration | Integer | Length of the video segment in seconds. |
| Filename | Character | File name of the video segment minus the storage location. |
| Program_id | Integer | Id from the program table representing the program that this clip belongs. |
| Bit_rate | Integer | Indexed value representing the capture rate. |
| Resolution | Integer | Indexed value representing the capture resolution. |
| Availability | Integer | Indexed value representing whether the video segment is directly available, in near-line storage or offline storage. |
| Mime_type_id | Integer | Id from the mime type table representing the delivery mime type. |
| File_location | Integer | Id from the file location table representing the storage location of the video segment. |
| Remote_capture_status | Integer | Index value used to by remote capture systems to determine the availability status of video segments that have been capture by remote systems. |

Storage manager 300 performs various "housekeeping" functions on the media content received and formatted by capture server 100 (not shown). For example, storage manager 300 tracks the age and popularity of the media content, and archives various less active or older selections. This may include transferring data between on-line data storage 310, near-line data storage 320 and off-line data storage 330 depending on the age and client use of the media content. In one embodiment of the invention, new or active media content will be kept in on-line media data storage 310 for quick access. Less active or older media content will be kept in near-line data storage 320 for reasonable automatic access when requested. Finally, old or inactive media content will be kept in off-line data storage 330 for archival purposes.

Storage manager 300 may also perform replication functions to assure that adequate copies of particular media content exists to satisfy the demands of client users. In one embodiment of the invention, if a particular selection of media content is popular, frequently being chosen by client users, storage manager 300 may create multiple copies of the particular selection for storage in data storage 120.

Storage manager 300 also performs retrieval function, and interacts with distribution server 115 (not shown) to retrieve and supply media content of near-line and off-line media content when selected by a client user. The storage manager 300 may also communicate with another distribution server (not shown) to determine whether the other distribution server is maintaining a copy of the media content requested.

Figure 4:
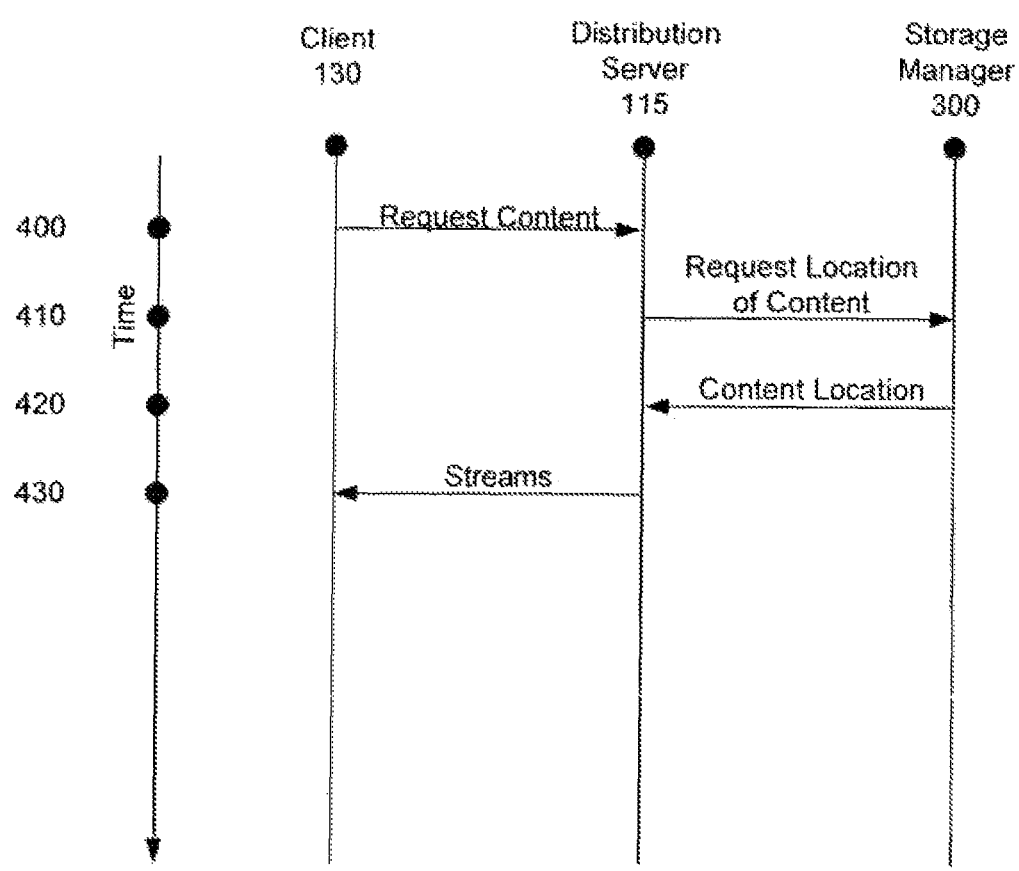
FIG. 4 is a time line illustrating the sequential steps to deliver media streams to a client.

From time to time, media content requested by a client user might be off-line or near-line. In those particular circumstances, the distribution server must communicate with the storage manager to determine if near-line or off-line data may be received. A time line illustrating the sequential steps to deliver off-line or near-line media content streams to a client is shown in FIG. 4.

In one embodiment of the invention, client user 130 makes a request to distribution server 115 for a stream of media content "X" in step 400. The request comprises an indication of the stream, a reference to the desired beginning point of the stream, and the duration or termination point of the stream. In a preferred embodiment, a zero may be used in lieu of the duration or termination point to indicate that the request is for delivery of the stream until terminated.

In a preferred embodiment, where multiple distribution servers are deployed, the distribution server 115 determines whether another distribution server could more efficiently fulfill the request. If so, the distribution server 115 would forward the request to such a distribution server for fulfillment at a "lower cost," otherwise, the distribution server 115 would fulfill the request.

The distribution server 115 that will fulfill the request translates it by determining where the corresponding data is located. In other words, the distribution server 115 uses the request to determine the file name of the media content blocks corresponding to the request. In a preferred embodiment, the distribution server 115 sends a request for such translation—that is, for the location of the content—to the Storage Manager 300, as in step 410.

Step 420 shows that the distribution manager 300 responds to the request by providing to the distribution server 113 the content location.

The distribution server 115 then retrieves the media content block from the data storage 120, and initiates the stream of media content to the client 130. To initiate the stream of media content to the client 130, the distribution server 115, among other things, sends a header indicating the length and/or duration of the playback. The distribution server 115 will thereafter transmit the first block of media content, and will stitch each successive media content block together as part of the single stream being transmitted to the client 130. The transmission of the stream is throttled by the distribution server 115.

It will be apparent to one of skill in the art that, for a given stream of media content, the client 130 need only make a single request to the distribution server 113 as shown in step 400. The distribution server 115, on the other hand, can either resolve a number of requests for the location of content relating to the stream at once, or alternatively, and preferably, will successively make and have location of content requests fulfilled, as shown in steps 410 and 420.

Figure 5:
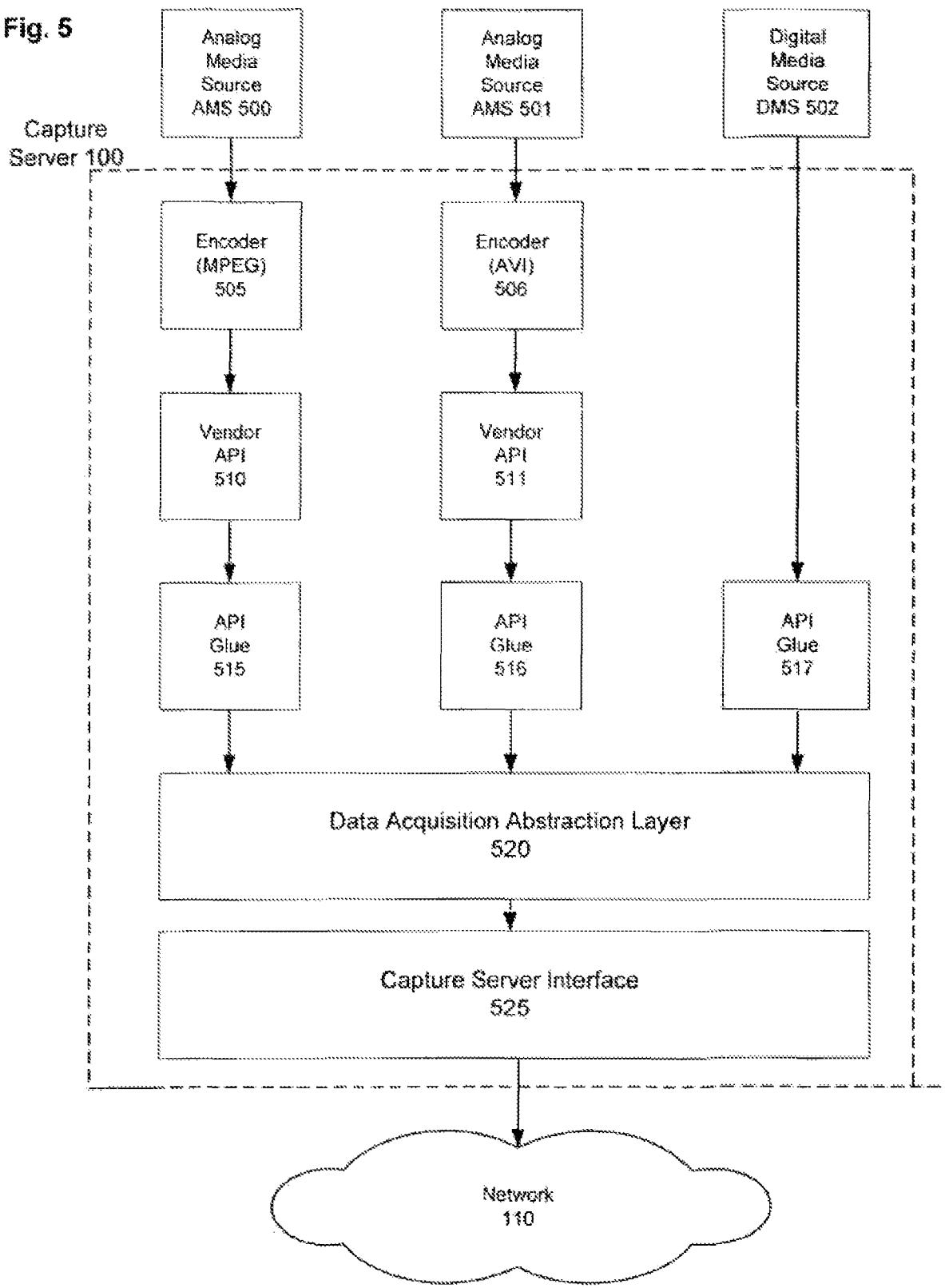
FIG. 5 is a block diagram illustrating the capture server's operations between media sources and the network.

A block diagram illustrating the capture server's operations between media sources and the network is shown in FIG. 5. This embodiment is shown in simplified form for the purpose of clarity. However, the method comprising the present invention is designed to replicate well beyond the size depicted here.

Capture server 100 comprises: encoders 505 and 506; vender application programming interfaces (API's) 510 and 511; API glue layers 515, 516, and 517; data acquisition abstraction layer (DAAL) 520 and capture server interface 525. Capture server 100 receives one or more digital or analog media signals from a variety of media sources. These signals may include network-broadcast signals, cable transmission signals, satellite transmission signals and Internet transmissions. Capture server 100 may receive analog media signals from media sources 500 and 501; and digital media signals from media source 502. Capture server 100 digitizes the signals (if necessary), and converts the digital media signals into addressable blocks.

Encoders 505 and 506 represent analog to digital encoders used to encode the analog signal into digital signal format. As shown in FIG. 5, the encoder 505 may be a Moving Picture Expert Group (MPEG) encoder and the other encoder 506 may be an Audio Video Interleave (AVI) encoder. The use of MPEG and AVI encoders to encode analog signals into digital signals is well known in the art. Encoder 505 converts analog MPEG media source signal 500 into a digital format for further processing by capture server 100. Similarly, encoder 506 converts analog AVI media source signal 501 into a digital format for further processing by capture server 100.

Vendor API 510 is an MPEG application programming interface. In one embodiment of the invention, API 510 is provided by the vendor supplying encoder 505 and is a hardware or software apparatus used to control encoder 505.

Vendor API 511 is an AVI application programming interface. In one embodiment of the invention, API 511 is provided by the vendor supplying encoder 506 and is a hardware or software apparatus used to control encoder 506.

In a preferred embodiment, no encoder or vendor API is required for the digital media source 502. The digital media source may originate in the capture server 100 in the form of an MPEG or AVI, or alternatively, in the form of a BMP, GIF or JPEG, or other file type. The digital media source 502 may be transported to the capture server 100 via, for example, FTP, NNTP or RTSP, or another protocol that is capable of conveying digital information of that type. See, for example, 105E in FIG. 1.

The API glue layers 515, 516 and 517 are hardware or software apparatus designed to transform the vendor API operations and/or the transport protocols into apparently uniform operations, so digital information is received in a consistent way.

Data acquisition abstraction layer (DAAL) 520 acts as a buffer and acquires transformed media content data from each media source and holds the media content for capture server interface 525. In the embodiment of the invention shown in FIG. 5, the DAAL 520 receives uniform media content from API glue 515, 516 and 517 and buffers this incoming data before processing by capture server interface 525.

Capture server interface 525 receives the media content from the DAAL 520, forms the media content blocks, and prepares meta-data for each media content block. Capture server interface 525 then saves this meta-data in an addressable form in meta-data storage (not shown) using network 110. Similarly capture server interface 525 saves the addressable media content blocks to data storage (not shown) using network 110.

As media content is passed through the API glue layer 515, 516 and 517, DAAL 520 and the capture server interface 525 it is organized and transformed into addressable content media blocks. This process is also referred to as a uniform transformation process. The addressable content media blocks resulting from the uniform transformation process permit later retrieval, beginning randomly at any block, by client users. Thus, the uniform transformation process transforms encoded media content from media source 500 into uniform data blocks. In one embodiment of the invention, the data blocks may all have equal size, being one minute in length.

In a further embodiment of the invention, a network transcoder (not shown) may be employed to change the media content data before DAAL 520. Changes performed by the network transcoder may include changes in resolution, format, etc. The network transcoder may be installed at any point in capture server 100 before DAAL 520.

While the foregoing describes and illustrates the preferred embodiment of the present invention and suggests certain modifications thereto, those of ordinary skill in the art will recognize that still further changes and modifications may be made therein without departing from the spirit and scope of the invention. Accordingly, the above description should be construed as illustrative and not in a limiting sense, the scope of the invention being defined by the following claims.

I claim:
1. A method for storing and retrieving media comprising:
receiving media associated with a media content element defined by a start time;
segmenting the received media into one or more time-sequenced media blocks, each media block comprising a full frame and one or more delta frames, wherein a resolution of the received media is determined in part by a number of delta frames in the media block;
associating at least one attribute to each of the one or more of the media blocks;

for each segmented media block determining a time reference to a corresponding portion of the media content element based at least in part on the start time;
indexing in storage each segmented media block by at least the time reference and the at least one attribute to create one or more addressable content media blocks such that each of the one or more addressable content media blocks is retrievable using at least the at least one attribute to enable random retrieval of time-sequenced stored media blocks beginning randomly at any of the one or more addressable content media blocks based on a media request;
receiving the media request, the media request including the at least one attribute;
enabling retrieval from storage at least one portion of a stored media block associated with the attribute;
enabling transmitting the at least one portion of the stored media block to a client based on the media request.

2. The method of claim 1 wherein each portion of the media block is addressable by time.

3. The method of claim 1 wherein each media block is stored as in a network file system.

4. The method of claim 1 wherein the media block is stored, at least in part by providing a storage location for each media block, the storage location associated with the time reference.

5. The method of claim 1 wherein the media comprises text and the media content element includes audio or video.

6. The method of claim 1 wherein the request includes a Uniform Resource Identifier (URI).

7. The method of claim 1 wherein the one or more stored media blocks comprise text associated with the media content element.

8. The method of claim 7 wherein the text associated with the media content element is Closed Captioned Data.

9. The method of claim 7 wherein the text associated with the media content element is associated with a content media block reference code.

10. The method of claim 1 further comprising retrieving a plurality of portions of stored media blocks associated with the at least one attribute, each of the plurality of portions of stored media blocks seamlessly stitched together for transmission.

11. The method of claim 1 wherein the attribute is a keyword.

12. The method of claim 1 wherein the attribute is a transcript.

13. A system for storing and distributing media comprising:
a capture server configured to:
receive media associated with a media content element defined by a start time;
segment the received media into one or more time-sequenced media blocks, each media block comprising a full frame and one or more delta frames;
determine a resolution of the media block based in part on a number of delta frames in the media block;
associating at least one attribute to each of the one or more of the media blocks;
for each segmented media block determine a time reference to a corresponding portion of the media content element based at least in part on the start time;
a storage manager configured to index in storage each segmented media block by at least the time reference and the at least one attribute to create one or more addressable content media blocks such that each of the one or more addressable content is retrievable using, at least the at least one attribute to enable random retrieval of time-sequenced stored media blocks beginning randomly at any of the one or more addressable content media blocks based on a media request; and
a distribution server configured to:
receive the media request, the media request including the at least one attribute;
enabling retrieval from storage at least one portion of a stored media block associated with the attribute;
enabling transmitting the at least one portion of the stored media block to a client based on the media request.

14. The system of claim 13 wherein each portion of the media block is addressable by time.

15. The system of claim 13 wherein each media block is stored in a network file system.

16. The system of claim 13 wherein the media block is stored, at least in part by providing a storage location for each media block, the storage location associated with the time reference.

17. The system of claim 13 wherein the media comprises text and the media content element includes audio or video.

18. The system of claim 13 wherein the request includes a Uniform Resource Identifier (URI).

19. The system of claim 13 wherein the one or more stored media blocks comprise text associated with the media content element.

20. The system of claim 13 wherein the distribution server is further configured to retrieve a plurality of portions of stored media blocks associated with the at least one attribute, each of the plurality of portions of stored media blocks seamlessly stitched together for transmission.

21. The system of claim 13 wherein the distribution server is further configured to throttle the transmission of the at least one portion of stored media block.

22. The system of claim 13, wherein the distribution server is configured to apply a cost algorithm and redirect the transmission to one or more alternative distribution servers based on results from the cost algorithm.

23. The system of claim 13 where in the media content element is received from a media source comprising at least one of the Internet, a network broadcast, a cable broadcast, a satellite broadcast, a closed-circuit broadcast, a radio broadcast.

* * * * *